United States Patent [19]
Blakewood, Jr. et al.

[11] Patent Number: 5,820,191
[45] Date of Patent: Oct. 13, 1998

[54] INNER-DOOR PANEL FOR A VEHICLE

[75] Inventors: Charles Huffman Blakewood, Jr., Vancouver, Wash.; Glenn Crocker, Marietta, Ga.

[73] Assignee: Freightliner Corporation, Portland, Oreg.

[21] Appl. No.: 675,643

[22] Filed: Jul. 3, 1996

[51] Int. Cl.$^6$ .................................................. B60J 5/04
[52] U.S. Cl. ................................ 296/37.13; 296/146.7; 296/152; 296/153
[58] Field of Search ........................... 296/39.1, 146.5, 296/146.6, 146.7, 152, 153, 37.13; 49/502

[56] References Cited

U.S. PATENT DOCUMENTS

| | | | |
|---|---|---|---|
| 3,989,275 | 11/1976 | Finch et al. | 296/146.7 X |
| 4,769,951 | 9/1988 | Kaaden | 296/146.6 X |
| 5,433,478 | 7/1995 | Naruse | 296/146.7 X |
| 5,462,482 | 10/1995 | Grimes | 296/146.7 X |

FOREIGN PATENT DOCUMENTS

| | | | |
|---|---|---|---|
| 579535 | 1/1994 | European Pat. Off. | 296/146.7 |

OTHER PUBLICATIONS

Drawings A18–21718, Freightliner prior art drawings, dated Jan. 1985.
Drawings A18–21719, Freightliner prior art drawings, date Jan. 1985.

*Primary Examiner*—Andrew C. Pike
*Attorney, Agent, or Firm*—Klarquist Sparkman Campbell Leigh & Whinston, LLP

[57] ABSTRACT

A structural inner-door panel for a door of a vehicle, such as a truck, has a body which is preferably monolithic and molded as a single piece of polymeric material. The body has a front side which faces towards the inside of the vehicle, and a back side opposite the front side. The body substantially spans the width of a truck door frame, and substantially spans the distance from the bottom of the door frame to the window opening. The body panel serves as a portion of the interior decor of the door without the need for additional structural support members other than the exterior metal panel of the door. The body front side is configured to have trim pieces and accessories attached thereto. The body may include an integral armrest, storage compartment, and a radio speaker well. The back side has a plurality of baffles projecting outwardly therefrom to provide strength and rigidity to the panel.

21 Claims, 3 Drawing Sheets

INNER-DOOR PANEL FOR A VEHICLE

FIELD OF THE INVENTION

This invention relates to a door panel for a vehicle, and in particular, a structural inner panel for the door of a truck.

BACKGROUND OF THE INVENTION

A truck door must serve many purposes beyond merely allowing for the ingress and egress into the truck cab. First, a typical truck door has an interior trim panel which forms a part of the overall decor of the interior of the truck cab. The interior trim panel of the door also covers part of the door frame as well as the outer panel of the door. Further, the interior portion of a truck door often contains many separately mounted features, such as radio speakers, armrests, and handles. A typical truck door also contains interior metal cross pieces spanning from side to side of the door in addition to the interior trim panel. These cross pieces impart structural strength and integrity to the door.

Thus, in order to accomplish some or all of these objectives, a typical truck door must contain a substantial number of parts and elements. Such elements can be quite costly to manufacture. Further, it can be difficult and complicated to install these elements during the truck manufacturing process. In addition, the repair, replacement, and/or maintenance of these elements can be cumbersome and expensive. Accordingly, there exists a need for a device which overcomes the problems discussed above as well as other problems.

SUMMARY OF THE INVENTION

The present invention provides an inner-door panel for use with a door frame of a vehicle. The inner-door panel is easy to manufacture, install, repair, and maintain. The present invention also provides an inner-door panel which imparts structural strength and integrity to the interior portion of a truck door without the need for additional interior side-to-side extending cross pieces or support elements intermediate the base of the window opening and lower edge portion of the door, as discussed herein. The inner-door panel also serves as the interior of the door and provides an aesthetically pleasing appearance. The inner-door panel of the present invention can have trim pieces and accessories conveniently attached thereto.

In the illustrated embodiment, the inner-door panel is a monolithic piece of material, and preferably, a single piece of molded plastic. The inner-door panel provides structural rigidity and strength sufficient to withstand normal forces applied to the interior of a truck door. The inner-door panel substantially spans the width of the door frame in a horizontal direction, and substantially spans the distance from the bottom of the door frame to the window in a vertical direction, without requiring additional structural support. The inner-door panel has a front side which faces the inside of the truck cab, and thus provides a substantial portion of the interior decor of the door.

In another aspect of the invention, the panel includes a network of strengthening ribs or baffles extending from its back side to provide strength and rigidity to the panel. In the illustrated embodiment, the back side of the panel has a plurality of baffles or reinforcing ribs arranged in a substantially horizontal manner which intersect a plurality of baffles or ribs arranged in a substantially vertical manner. In this manner, the inner-door panel does not require additional structural supporting frame pieces spanning the interior of the door beneath the outer skin of the door.

In yet a further aspect of the invention, the inner-door panel is capable of having trim pieces and accessories attached thereto. In the illustrated embodiment, the front side of the inner-door panel has an armrest support projecting therefrom for attachment of an armrest. The armrest support is preferably a monolithic portion of the door panel. Also, in accordance with this embodiment, the door panel has a speaker well for receiving a radio speaker. The inner-door panel also has a storage compartment projecting outwardly therefrom for storing articles in the door panel. The storage compartment is also preferably a monolithic portion of the door panel. The inner-door panel is also capable of accommodating an optional window, for example in the passenger side door, to allow visibility through the lower portion of the door. Thus, the inner-door panel, in addition to serving as the interior decor and structural element for the door, also allows components to be attached thereto in a manner which makes them easy to install and repair or replace. In the most preferred form of the invention, upper outwardly projecting edges of the respective storage compartment and armrest support form handles which may be easily and safely used during ingress and egress from the truck. These handles are structural in that they are monolithically integrated into the door panel. Also, by including closely spaced reinforcing ribs along the interior upper edges of these handle components, the user senses the substantial thickness and strength of the handles.

In yet another aspect of the invention, the inner-door panel has a plurality of fastener receiving columns therethrough for receiving fasteners for conveniently and easily attaching the door panel to the surrounding door frame, as well as attaching trim pieces and accessories. The fastener receiving columns can be provided with reinforcing fins to strengthen the columns.

These and other features, objects, and advantages of the present invention will become more apparent with reference to the drawings and the description below.

DETAILED DESCRIPTION OF PREFERRED EMBODIMENTS

Figure 1:
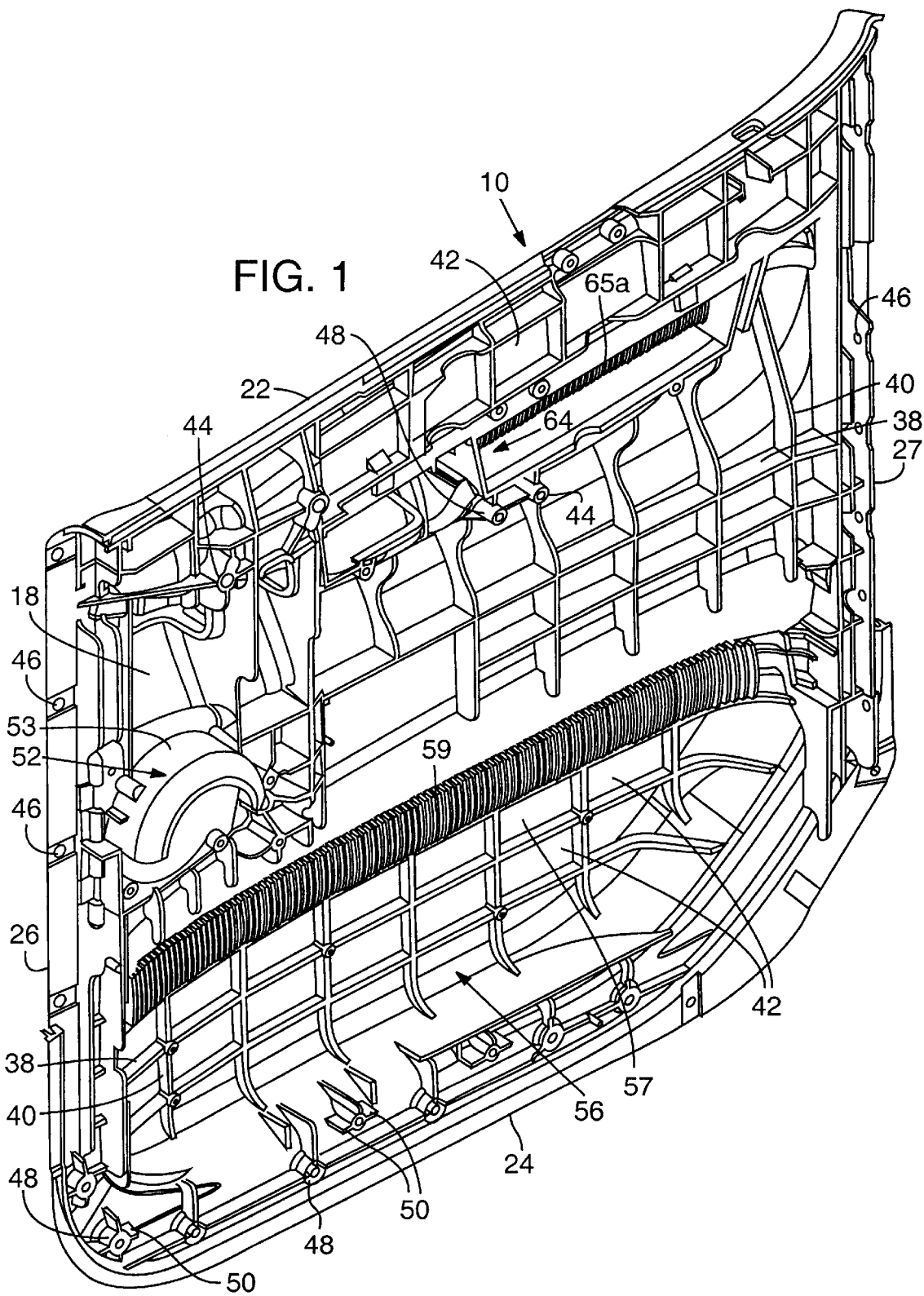
FIG. 1 is a perspective view of the back side of one form of an inner-door panel (for the driver side of a vehicle) of the present invention.
Figure 2:
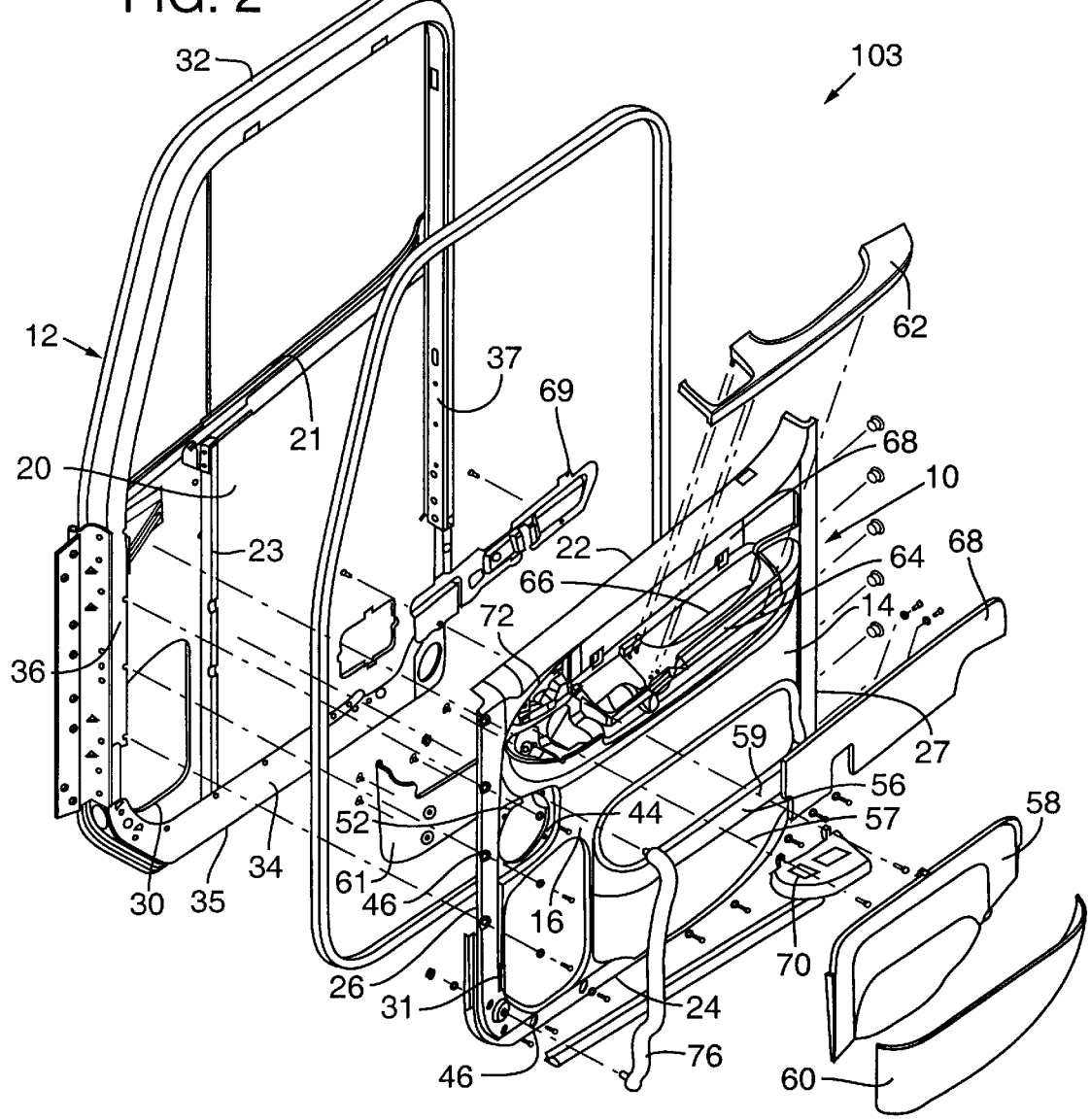
FIG. 2 is an exploded perspective view of a passenger-side truck door showing an embodiment of the inner-door panel of the present invention.
Figure 3:
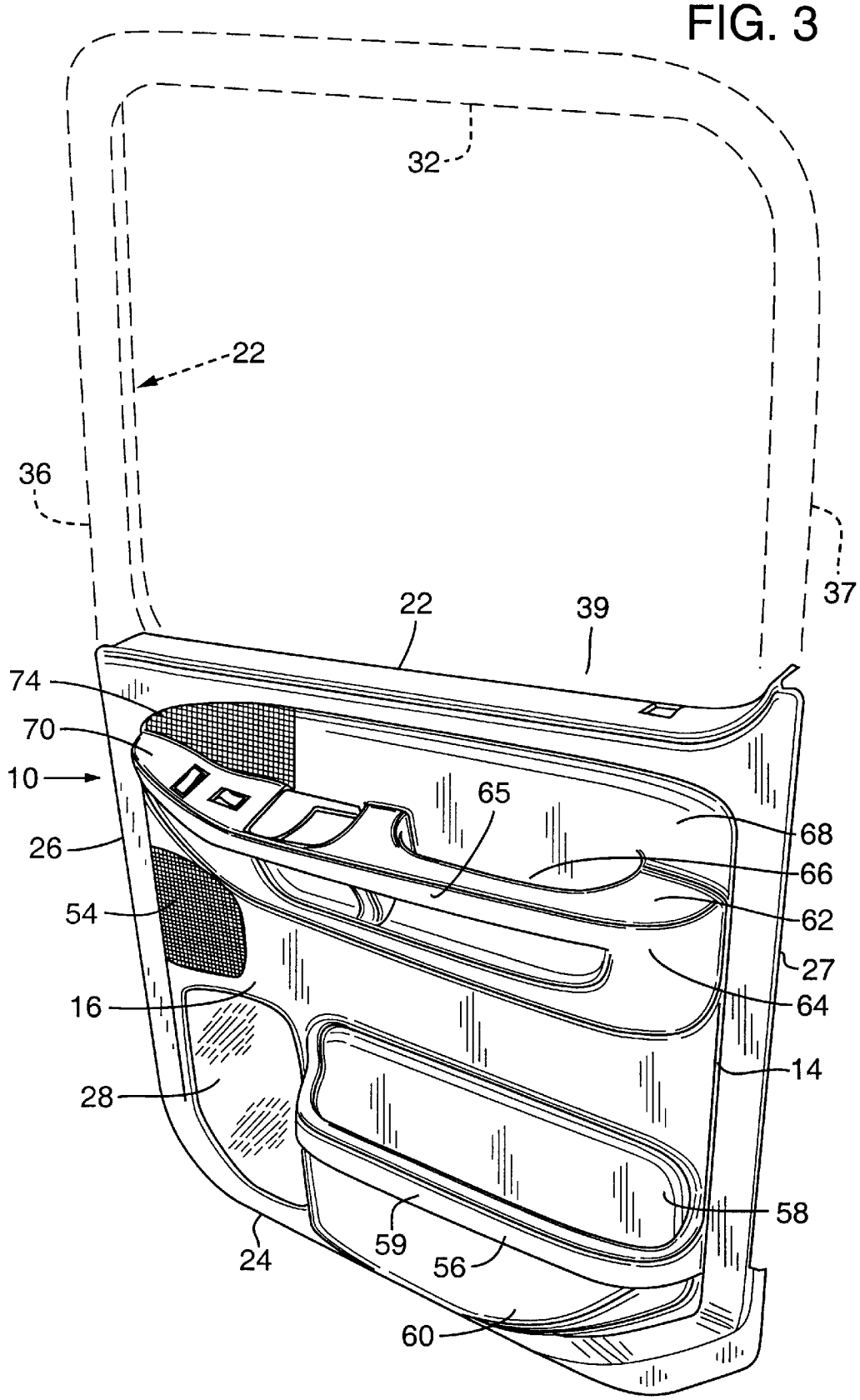
FIG. 3 is a plan view of the embodiment of the inner-door panel of FIG. 2 with the door frame illustrated in dashed lines.

FIGS. 1–3 illustrate forms of the inner-door panel 10 of the present invention. More particularly, the present invention relates to a most preferably monolithic inner-door panel 10 for a truck (not shown).

The inner-door panel 10 is suitable for attachment to a door frame 12 of a truck door, as illustrated in FIG. 2. The inner-door panel 10 has a body 14 having a front side 16, or a side facing the inside of the truck cab, and a back side 18 (FIG. 1) opposite the front side 16. The front and back sides are the major opposite surfaces of the inner door panel 10. The back side 18 of the inner-door panel 10 is hidden from view by the exterior door panel or skin 20 (FIG. 2) when the panel is attached to the door frame 12. The inner-door panel body 14 also has a top end 22, a bottom end 24, and front and rear edges 26, 27. (For reference purposes, FIG. 1 illustrates the back side 18 of a driver side, inner-door panel 10, while FIGS. 2–3 illustrate the front side 16 of a passenger side, inner-door panel 10. Unlike the driver side panel, the passenger side panel has an optional window 28 therein (which coincides with an opening 30 in the exterior door skin 20 on the passenger side as shown in FIG. 2, and with an opening 31 in the door panel 10).) The outer skin has an edge 21 along the base of the window opening. A vertical window guide 23 extends between edges 35 and 21 and interiorly of the door skin.

The inner-door panel 10 of the present invention is most preferably a monolithic structure. In other words, the inner-door panel 10 is formed as a single piece of material. The door panel 10 is preferably molded of a polymeric material such as plastic. A specific example of a preferred plastic material is counter pressure and/or structural foam polycarbonate such as "LEXAN® FL 1600" plastic from GE Plastic. In this way, the panel 10 is relatively easy to manufacture and install, while providing the necessary structural strength and rigidity as discussed below.

As illustrated in FIG. 1, the truck door is comprised in part of a door frame 12. The door frame 12 generally has a top frame portion 32, a bottom frame portion 34, and front and rear side frame portions 36, 37. The inner-door panel 10 substantially spans the width of the door frame 12 as defined by the side frame portions 36, 37. In other words, in the horizontal direction, the side edges 26, 27 of the inner-door panel 10 substantially span to, or terminate at, the respective side frame portions 36, 37. Further, in the vertical direction, the bottom end 24 of the inner-door panel 10 substantially spans to, or terminates at, the bottom frame portion 34, and the top end 22 spans to, or terminates at, the window opening 39. As such, the side edges 26, 27 are preferably mounted to the respective side frame portions 36, 37 and the bottom end 24 is attached to the bottom frame portion 34. (In this sense, the top end 22 of inner-door panel 10 essentially defines the lower portion of the window opening 39.)

Besides the inner-door panel 10, the only other structure which spans the door frame 12 in generally this manner is the exterior or outer metal panel 20 of the door. The illustrated inner-door panel 10 thus provides a monolithic structure which serves as both the interior decor of the door in part, and the interior structural door support. Besides providing these advantages, the inner-door panel 10 is also relatively easy to manufacture and install, and allows for convenient attachment and maintenance of trim pieces and other accessories, as discussed below.

As illustrated, the back side 18 of the inner-door panel 10 includes a plurality of outwardly protruding reinforcing flanges, ribs, or baffles, some being indicated by the numbers 38, 40. These ribs preferably intersect one another to form a plurality of enclosures bounded by the ribs. In the illustrated form, ribs 38, 40 are substantially horizontally and vertically arranged to provide structural rigidity and strength. The ribs may form honeycomb enclosures, extend diagonally, or otherwise be configured, although it is preferred that they form a multiplicity of enclosures at the back side of the door panel. The baffles or ribs 38, 40 may extend substantially perpendicularly outwardly from the surface of the back side 18 of the inner-door panel 10. In the illustrated form, the vertical baffles 40 generally intersect the horizontal baffles 38 to essentially form a plurality of rectangularly shaped enclosures or structures 42. The baffles or ribs 38, 40 are provided at spaced locations over a substantial area of the back side 18 of the panel 10, preferably at least about one-half of this area and essentially are provided over those portions of the back side of the panel which do not have other specially configured features (as discussed below). It has been found that the intersecting baffles 38, 40 provide strength and rigidity to the door panel 10 sufficient to withstand normal loads and forces applied to the interior of a truck door, without the need for additional support beyond the door frame and structure as discussed herein and shown in the drawings. It should be appreciated that the passenger side panel 10 has similarly arranged baffles 38, 40.

Referring to FIGS. 1 and 2, the inner-door panel 10 is provided with holes, some being indicated at 44, to receive fasteners, and the like, for attaching trim pieces and accessories thereto. The panel 10 also has holes, some being indicated at 46, for receiving fasteners to attach the panel to the door frame. Certain of the fastener receiving holes 44 extend through tubular elements or fastener receiving columns 48 formed in the inner-door panel 10. Some of these fastener receiving columns 48 have reinforcing elements or fins 50 extending therefrom to provide added strength and rigidity. As shown in FIG. 1, the illustrated fins 50 generally extend from the fastener receiving columns 48 in a vertical or horizontal direction. Generally, in the form shown, the fins 50 on the columns are arranged approximately ninety degrees apart from the nearest fin. In this manner, the columns 48 are reinforced. As a result, the trim pieces and accessories attached to the inner-door panel 10 are held more firmly to the panel. Likewise, the panel 10 is held more firmly to the door frame 12 when using these reinforced columns 48 (in conjunction with fasteners) to fasten the panel. It should also be appreciated that the back side 18 of the inner-door panel 10 for the passenger side has similarly arranged fastener receiving columns 48 for receiving fasteners and the like.

The front side 16 of the door panel 10 is configured to have various trim pieces and accessories attached thereto. More particularly, and as shown in FIG. 1, the inner-door panel 10 has a speaker well 52 or recess for receiving a radio speaker (not shown). The illustrated speaker well opening is essentially circular in shape and has an arcuate roof portion 53 (FIG. 1). The periphery of the inner-door panel surrounding the speaker well has holes 44 for receiving fasteners in order to attach the speaker and related components to the panel. For instance, a speaker grille 54 (FIG. 3) can be attached to the door panel 10 to cover and protect the speaker and to provide a pleasing appearance.

A storage compartment or map pocket 56 for holding items is also formed as part of the inner-door panel 10, and preferably has a front panel 57 and upper rim 59 which is monolithic with the body 14. As shown in FIGS. 2 and 3, the storage compartment 56 projects from the front side 16 and substantially extends horizontally across a major portion of the width of the panel. The pocket preferably projects outwardly from the main body of the door panel and thus into the interior of the cab. The rim 59 is therefore in a position where it may easily be grasped and used as a handle during ingress and egress from the truck. Plural closely spaced parallel upright rim reinforcing ribs are positioned along the length of the rim 59. These ribs strengthen the rim and provide a user with a strong relatively wide handle surface for grasping. The pocket 56 is provided with a liner 61 which overlies the ribs of panel 57 inside the pocket and which also bounds the bottom of the pocket. A compartment backing element 58 (shown in part in FIG. 2) is preferably inserted in the pocket 56 and attached to the panel 10 to close the backside of the pocket or storage compartment 56. As shown in FIG. 2, a trim piece, such as carpet or fabric 60, may be attached to the lower outside portion of the outwardly projecting storage compartment 56 to provide a more pleasing appearance.

Other trim pieces are attached to the inner-door panel 10 in order to hide the underlying mechanical mechanisms, such as perhaps the door opening mechanism and electronic controls (not shown). In particular, an armrest trim piece 62 is attached to an armrest support 64 which projects outwardly from the door panel 10, see FIGS. 2 and 3. The armrest support 64 is also preferably formed as a part of a monolithic body of the door panel 10. The armrest support, like the storage pocket, also preferably projects outwardly from the door panel and into the cab interior. The armrest support forms a handle 65 for use during ingress and egress from the truck. The handle 65 is preferably reinforced with ribs 65a like those on the rim 59 of the storage compartment. The armrest trim piece 62 is configured to provide an opening 66 once it is attached to the armrest support 64 so that the driver can grip the armrest 62 in order to close or open the door. Also, an upper armrest trim piece 68 is attached to the inner-door panel 10 to span the space above the armrest and also to fill in the back surface of the armrest opening 66. A backing plate 69, typically of sheet metal or of plastic, is mounted to the back side of the door panel 10 to back up or reinforce the trim piece 68. A switch cover panel 70 is also attached to the armrest support 64, see FIGS. 2 and 3. In addition, a smaller speaker well 72 can be provided for receiving a smaller radio speaker (not shown), such as a tweeter speaker. Preferably, the smaller speaker well 72 is located just above and essentially perpendicularly to the switch panel 70. A speaker grille 74 (FIG. 3) can be attached to the door panel 10 (or speaker) to cover and protect this smaller speaker and to provide an aesthetically pleasing appearance.

As shown on the passenger side panel 10 in FIG. 2, a handle 76 (in addition to the monolithic integral handles formed by the door pocket and armrest support) can be attached to the inner-door panel. A person can grip any of the handles including the handle 76 to more easily pull himself or herself up into the cab when entering the truck cab from the outside or leaving the truck. And as discussed above, the passenger side door can be provided with a window 28 to enable the driver to see outside of the truck cab below the passenger side window.

The inner-door panel 10 of the present invention is of a construction which is structurally rigid and strong so that it is capable of withstanding forces normally applied to the interior of a truck door, without the need for other interior support structures as discussed. The inner-door panel 10 also preferably provides a monolithic structure which spans the door frame in a horizontal direction, and in a vertical direction (up to the window opening). Thus, in this respect, the inner-door panel also serves as the interior panel of the door which is substantially visible to the occupants without the need for other interior decor elements, except for trim pieces and accessories. The inner-door panel thus provides an aesthetically pleasing appearance. As mentioned, the inner-door panel also allows trim pieces and accessories to be conveniently and easily attached thereto. The inner-door panel of the present invention is relatively easy to manufacture and install, and allows for convenient and easier repairs and maintenance of the door structure.

Having described and illustrated the principles of the invention with reference to a preferred embodiment and several variations thereon, it should be apparent that the invention can be modified in arrangement and detail without departing from its principles. Accordingly, we claim all modifications as may come within the scope and spirit of the following claims.

What is claimed is:

1. An inner-door panel for use with a vehicle door frame having a top frame portion, side frame portions, and a bottom frame portion, said portions defining a window opening having a base, the inner-door panel comprising:

a monolithic body;

said body having a front side which faces an inside of a vehicle when attached to the vehicle door frame, and a back side opposite the front side, the front and back sides being opposite major surfaces of the body;

said body having a top end, a bottom end, and side edges;

said side edges extending substantially to the respective side portions of the door frames said bottom end extending substantially to the bottom portion of the door frame, and said top end extending substantially to the base of the window opening, when the inner-door panel is attached to the door frame; and the body having a plurality of reinforcing baffles or ribs projecting outwardly from the back side.

2. The inner-door panel of claim 1, wherein the body is molded of a polymeric material.

3. The inner-door panel of claim 1, wherein a plurality of the baffles are arranged substantially horizontally along the back side.

4. The inner-door panel of claim 1, wherein a plurality of the baffles are arranged substantially vertically along the back side.

5. The inner-door panel of claim 1, wherein a plurality of the baffles intersect one another to define enclosures therebetween.

6. The inner-door panel of claim 5, wherein a plurality of the enclosures are rectangular.

7. The inner-door panel of claim 1, wherein the body further includes an armrest support projecting therefrom.

8. The inner-door panel of claim 1, further including a handle having plural reinforcing ribs monolithically integrated into the body of the door panel, whereby the handle may be used by a user for egress from and ingress to the vehicle.

9. The inner-door panel of claim 1, wherein the body further includes at least one speaker well.

10. The inner-door panel of claim 1, wherein the front side of the body includes a projecting storage compartment side panel.

11. An inner-door panel for use with a vehicle door frame having a top frame portion, side frame portions, and a bottom frame portion, said portions defining a window opening having a base, the inner-door panel comprising:

a monolithic body;

said body having a front side which faces an inside of a vehicle when attached to the vehicle door frame, and a back side opposite the front side, the front and back sides being opposite major surfaces of the body;

said body having a top end, a bottom end, and side edges;

said side edges extending substantially to the respective side portions of the door frame, said bottom end extending substantially to the bottom portion of the door frame, and said top end extending substantially to the base of the window opening, when the inner-door panel is attached to the door frame;

said front side of said body having a projecting storage compartment side panel; and wherein the storage compartment side panel defines a rim having a plurality of reinforcing ribs to strengthen the rim for use as a handle.

12. An inner-door panel for use with a truck door frame having a top frame portion, side frame portions, and a bottom frame portion, said portions defining a window opening having a base, the inner-door panel comprising:

a monolithic body;

said body having a front side which faces an inside of a truck when attached to the truck doorframe, and a back side opposite the front side, said front side being capable of having trim pieces and accessories attached thereto;

said body substantially spanning the door frame in a horizontal direction, and said panel substantially spanning a distance from the base of the window opening to the bottom frame portion of the door frame in a vertical direction, when attached to the door frame; and the body including a plurality of reinforcing baffles projecting outwardly from the back side of the inner-door panel.

13. The inner-door panel of claim 12, wherein a plurality of the baffles are arranged substantially horizontally on the back side of the panel.

14. The inner-door panel of claim 12, wherein a plurality of the baffles are arranged substantially vertically on the back side of the panel.

15. The inner-door panel of claim 12, wherein a plurality of the baffles intersect one another to define enclosures at the back side of the body.

16. The inner-door panel of claim 15, wherein a plurality of the enclosures are rectangular.

17. The inner-door panel of claim 12, wherein the body further includes an armrest support projecting outwardly therefrom.

18. The inner-door panel of claim 12, wherein the panel further includes at least one speaker well with an arcuate roof.

19. The inner-door panel of claim 12, wherein the body further includes a storage compartment panel projecting outwardly at the front side of the body.

20. An inner-door panel for use with a truck door frame having a top frame portion, side frame portions, and a bottom frame portion, said portions defining a window opening having a base, the inner-door panel comprising:

a monolithic body;

said body having a major front side surface which faces an inside of a truck when attached to the truck door frame, and a major back side opposite the front side surface;

said body having a top end, a bottom end, and side edges;

said side edges being mounted to the respective side portions of the door frame, said bottom end being mounted to the bottom frame portion of the door frame, and said top end terminating at the base of the window opening, when the panel is attached to the door frame;

the body further including an armrest support projecting from the front side surface of the panel, at least one speaker well, and a storage compartment panel projecting outwardly from the front side surface of the body, the armrest support, the speaker well, and the storage compartment panel being monolithic with the body; and the body having a plurality of intersecting reinforcing ribs projecting outwardly from the back side.

21. The inner-door panel of claim 20, wherein at least a portion of the front side surface is exposed at the inside of the truck.

* * * * *

UNITED STATES PATENT AND TRADEMARK OFFICE
CERTIFICATE OF CORRECTION

PATENT NO. : 5,820,191
DATED : October 13, 1998
INVENTOR(S) : Blakewood et al.

It is certified that error appears in the above-identified patent and that said Letters Patent is hereby corrected as shown below:

<u>Title page,</u>
Item [57], ABSTRACT,
Line 2, "such as a truck, has a" should read -- such as a truck, is disclosed. The inner-door has a --.

<u>Column 2,</u>
Line 63, "major opposite surfaces" should read -- major opposed surfaces --.

<u>Column 3,</u>
Line 8, "10).)" should read -- 10). --.

Signed and Sealed this

Twelfth Day of November, 2002

*Attest:*

JAMES E. ROGAN
*Attesting Officer*  *Director of the United States Patent and Trademark Office*